United States Patent
Kageyama et al.

(10) Patent No.: US 8,468,349 B2
(45) Date of Patent: Jun. 18, 2013

(54) WIRELESS COMMUNICATION DEVICE, WIRELESS COMMUNICATION METHOD, AND PROGRAM

(75) Inventors: Yuichi Kageyama, Tokyo (JP); Hideyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 197 days.

(21) Appl. No.: 13/005,852

(22) Filed: Jan. 13, 2011

(65) Prior Publication Data

US 2011/0191825 A1 Aug. 4, 2011

(30) Foreign Application Priority Data

Feb. 4, 2010 (JP) ................................ P2010-022972

(51) Int. Cl.
*H04L 29/06* (2006.01)

(52) U.S. Cl.
USPC ............................................ 713/168; 726/27

(58) Field of Classification Search
None
See application file for complete search history.

(56) References Cited

U.S. PATENT DOCUMENTS

2004/0093523 A1* 5/2004 Matsuzaki et al. ............ 713/201

FOREIGN PATENT DOCUMENTS

JP 2002-247052 8/2002

* cited by examiner

*Primary Examiner* — Hadi Armouche
*Assistant Examiner* — Izunna Okeke
(74) *Attorney, Agent, or Firm* — Finnegan, Henderson, Farabow, Garrett & Dunner, L.L.P.

(57) ABSTRACT

There is provided a wireless communication device including a storage unit for storing authentication information distributed to a plurality of users including a user of the wireless communication device belonging to a community on a network; an authentication unit for authenticating a peripheral wireless communication device based on the authentication information stored in the storage unit; and a control unit for forming a communication group with the peripheral wireless communication device when the authentication of the peripheral wireless communication device by the authentication unit is successful.

6 Claims, 12 Drawing Sheets

FIG. 6

| Category | Action | Dialog Token | Advertisement Protocol IE | Query Request Length | Query Request |
|---|---|---|---|---|---|
| 4 | 10 | Token ID | Defined in IEEE 802.11u | Length | |

| Info ID | Length | Vendor Specific Content | | |
|---|---|---|---|---|
| 56797 | Length | OUI | | |
| | | 00 50 F2 | | |

| OUI Subtype | Service Update Indicator | Length | Service Protocol Type | Length | Service Transaction ID | Query Data |
|---|---|---|---|---|---|---|
| 9 | Counter value | Length | 255(Vendor Specific) | Length | Transaction ID | |

| Vendor OUI | Query Request Type | Request Value |
|---|---|---|
| 00 50 F2 | "Community Information" | XXXX |

FIG. 7

| Category | Action | Dialog Token | Status Code | GAS Comeback Delay | Advertisement Protocol IE | Query Request Length | Query Request |
|---|---|---|---|---|---|---|---|
| 4 | 11 | Token ID | Status Code | 0 | Defined in IEEE 802.11u | Length | |

| Info ID | Length | Status Code | OUI | Vendor Specific Content |
|---|---|---|---|---|
| 56797 | Length | Status Code | 00 50 F2 | |

| OUI Subtype | Service Update Indicator | Length | Service Protocol Type | Length | Service Transaction ID | Status Code | Response Data |
|---|---|---|---|---|---|---|---|
| 9 | Counter value | Length | 255(Vendor Specific) | Length | Transaction ID | Status Code | |

| Vendor OUI | Query Response Type | Response Value |
|---|---|---|
| 00 50 F2 | "Community Information" | xxxx |

FIG. 8

| Category | Action | Dialog Token | Advertisement Protocol IE | Query Request Length | Query Request |
|---|---|---|---|---|---|
| 4 | 10 | Token ID | Defined in IEEE 802.11u | Length | |

| Info ID | Length | Vendor Specific Content | |
|---|---|---|---|
| 56797 | Length | OUI | 00 50 F2 |

| OUI Subtype | Service Update Indicator | Length | Service Protocol Type | Length | Service Transaction ID | Query Data |
|---|---|---|---|---|---|---|
| 9 | Counter value | Length | 255(Vendor Specific) | Length | Transaction ID | |

| Vendor OUI | Query Request Type | Query Value |
|---|---|---|
| 00 50 F2 | "Service Level Authentication" | Encrypted Pass Phrase |

FIG. 9

| Category | Action | Dialog Token | Status Code | GAS Comeback Delay | Advertisement Protocol IE | Query Request Length | Query Request |
|---|---|---|---|---|---|---|---|
| 4 | 11 | Token ID | Status Code | 0 | Defined in IEEE 802.11u | Length | |

| Info ID | Length | Status Code | OUI | Vendor Specific Content |
|---|---|---|---|---|
| 56797 | Length | Status Code | 00 50 F2 | |

| OUI Subtype | Service Update Indicator | Length | Service Protocol Type | Service Transaction ID | Status Code | Response Data |
|---|---|---|---|---|---|---|
| 9 | Counter value | Length | 255(Vendor Specific) | Transaction ID | Status Code | |

| Vendor OUI | Query Response Type | Response Value |
|---|---|---|
| 00 50 F2 | "Service Level Authentication" | Status : Success/Failed |

WIRELESS COMMUNICATION DEVICE, WIRELESS COMMUNICATION METHOD, AND PROGRAM

BACKGROUND OF THE INVENTION

1. Field of the Invention

The present invention relates to a wireless communication device, a wireless communication method, and a program.

2. Description of the Related Art

Recently, the wireless LAN (Local Area Network) represented by IEEE (Institute of Electrical and Electronics Engineers) 802.11 is becoming more popular in place of a wired network due to advantages such as high degree of freedom of the device. The wireless LAN system defined in the IEEE 802.11 is configured by a group of wireless communication devices including an access point that operates as a parent unit, and a plurality of stations that operate as a child unit, where one access point is connected to the plurality of stations.

In Wi-Fi direct being designed in the Wi-Fi Alliance, it is proposed that a plurality of wireless communication devices determine whether to act as a group owner (parent unit) or a client (child unit) and form a communication group. The parent unit operates as a simple access point, and has a function of connecting one or two or more child units.

Japanese Patent Application Laid-Open No. 2002-247052 discloses a method for a plurality of wireless communication devices to form a communication group by having the users of the plurality of wireless communication devices perform a simple operation. Specifically, Japanese Patent Application Laid-Open No. 2002-247052 describes having each user input the same keyword to the wireless communication device and the plurality of wireless communication devices input with the same keyword forming the communication group.

SUMMARY OF THE INVENTION

However, in the method of the related art, even a third person can join the communication group if such third person knows the keyword. Thus, the method of the related art has an issue of being unsuitable for forming a closed communication group in which the participants are to be limited.

In light of the foregoing, it is desirable to provide a novel and improved wireless communication device, wireless communication method, and program capable of easily forming a communication group including wireless communication devices of a plurality of users belonging to a community on the network.

According to an embodiment of the present invention, there is provided a wireless communication device including a storage unit for storing authentication information distributed to a plurality of users including a user of the wireless communication device belonging to a community on a network, an authentication unit for authenticating a peripheral wireless communication device based on the authentication information stored in the storage unit, and a control unit for forming a communication group with the peripheral wireless communication device when the authentication of the peripheral wireless communication device by the authentication unit is successful.

The wireless communication device may further includes a transmission unit for transmitting community information corresponding to the community to which the user of the wireless communication device belongs; and a reception unit for receiving the community information of the user of the peripheral wireless communication device from the peripheral wireless communication device. The authentication unit may perform the authentication when the community to which the user of the wireless communication device belongs and the community to which the user of the peripheral wireless communication device belongs are the same.

The transmission unit may further transmit information indicating whether or not the user of the wireless communication device is an organizer of the community, and the control unit may further form the communication group with the peripheral wireless communication device when either one of the user of the wireless communication device or the user of the peripheral wireless communication device is the organizer of the community.

The control unit transmit organizer information of the community from the transmission unit to the peripheral wireless communication device when both of the user of the wireless communication device and the user of the peripheral wireless communication device are not the organizer of the community.

When the user of the wireless communication device is the organizer of the community, the wireless communication device may perform a negotiation with the peripheral wireless communication device so that the wireless communication device preferentially operates as a group owner of the communication group.

According to another embodiment of the present invention, there is provided a wireless communication method executed by a wireless communication device, the method including the steps of storing, in a storage medium, authentication information distributed to a plurality of users including a user of the wireless communication device belonging to a community on a network, authenticating a peripheral wireless communication device based on the authentication information; and forming a communication group with the peripheral wireless communication device when the authentication of the peripheral wireless communication device is successful.

According to another embodiment of the present invention, there is provided a program for causing a computer to function as a wireless communication device, the wireless communication device including a storage unit for storing authentication information distributed to a plurality of users including a user of the wireless communication device belonging to a community on a network, an authentication unit for authenticating a peripheral wireless communication device based on the authentication information stored in the storage unit, and a control unit for forming a communication group with the peripheral wireless communication device when the authentication of the peripheral wireless communication device by the authentication unit is successful.

According to the embodiments of the present invention described above, the communication group including the wireless communication devices of the plurality of users belonging to a community on the network can be easily formed.

BRIEF DESCRIPTION OF THE DRAWINGS

FIG. 6 is an explanatory view showing a configuration example of a Community Information Query Request;

FIG. 7 is an explanatory view showing a configuration example of a Community Information Query Response;

FIG. 8 is an explanatory view showing a configuration example of a Service Level Authentication Query Request;

FIG. 9 is an explanatory view showing a configuration example of a Service Level Authentication Query Response;

DETAILED DESCRIPTION OF THE EMBODIMENT

Figure 1:
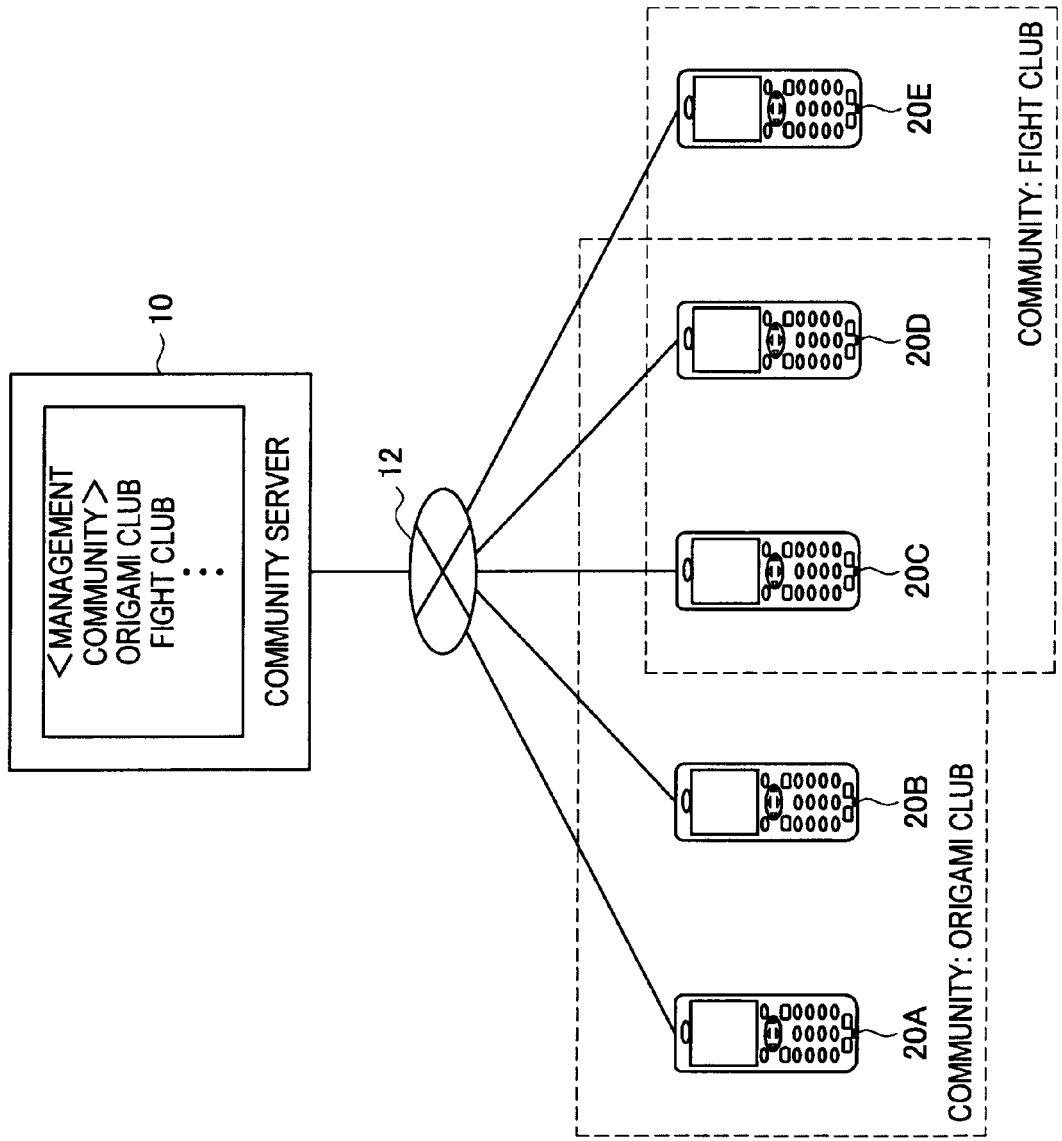
FIG. 1 is an explanatory view showing a configuration of a communication system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In this specification and the appended drawings, the plurality of structural elements that have substantially the same function and structure are sometimes denoted with different alphabets after the same reference numerals to distinguish the structural elements. For instance, a plurality of configurations that have substantially the same function and structure are distinguished as wireless communication devices 20A, 20B, and 20C as necessary. However, only the same reference numeral is given if each of the plurality of structural elements that have substantially the same function and structure do not need to be distinguished. For instance, the wireless communication devices 20A, 20B, and 20C are simply referred to as the wireless communication device 20 if distinction is not particularly necessary.

Also, the detailed description of the embodiment is described in the following order of items.

1. Configuration of communication system
2. Configuration of wireless communication device
3. Operation of wireless communication system
4. Operation of wireless communication device
5. Conclusion <Configuration of Communication System>

First, a configuration of a communication system 1 according to an embodiment of the present invention will be described with reference to FIG. 1.

FIG. 1 is an explanatory view showing a configuration of the communication system 1 according to an embodiment of the present invention. As shown in FIG. 1, the communication system 1 according to the embodiment of the present invention includes a community server 10, a network 12, and wireless communication devices 20A to 20E.

The network 12 is a wired or wireless transmission path of information transmitted from a device connected to the network 12. For instance, the network 12 may be a public line network such as Internet, telephone line network, and satellite communication network, various types of LAN (Local Area Network) including Ethernet (registered trademark), WAN (Wide Area Network), and the like. The network 12 may include a dedicated line network such as IP-VPN (Internet Protocol-Virtual Private Network), and the like.

The community server 10 and the wireless communication device 20 communicate through the network 12. Although the illustration is omitted in FIG. 1, a greater number of community servers 10 and wireless communication device 20 are actually assumed to be connected to the network 12.

The community server 10 manages a Web site for a community made up of a plurality of users that share the same concern and interest. The user belonging to the community uses a communication device such as the wireless communication device 20 and accesses the Web site to exchange information with other users or collect information.

Each user belonging to each community managed by the community server 10 plays the role of an organizer or a member. For instance, the organizer is a person who initiatively operates the community such as a launcher or a manager of the community, and the member is a person who operates in the community under the management of the organizer.

In FIG. 1, an origami club and a fight club are illustrated as an example of the community managed by the community server 10, but the type and number of communities managed by the community server 10 are not particularly limited.

The wireless communication device 20 accesses the Web site of the community managed by the community server 10 through the network 12 to exchange information and collect information. Each wireless communication device 20 can access the Web site of the community to which the user owning each wireless communication device 20 belongs.

For instance, as shown in FIG. 1, the users of the wireless communication devices 20A to 20D belong to the "origami club", and the users of the wireless communication devices 20C to 20E belong to the "fight club". In this case, the wireless communication devices 20A and 20B can access the Web site of the "origami club", and the wireless communication device 20E can access the Web site of the "fight club". Furthermore, the wireless communication devices 20C and 20D belonging to a plurality of communities can access the Web sites of both the "fight club" and the "origami club".

A portable telephone is illustrated in FIG. 1 as one example of a communication device that communicates with the community server 10, but the communication device is not limited to such example. For instance, the communication device may be an information processing device such as a PC (Personal Computer), home video processing device (DVD recorder, videocassette recorder etc.), PDA (Personal Digital Assistants), home game machine, and home electronics device. Furthermore, the communication device may be an information processing device such as a PHS (Personal Handyphone System), portable music reproduction device, portable video processing device, and portable game device.

Each wireless communication device 20 has a function of connecting with the peripheral wireless communication devices 20 and communicating wirelessly. For instance, each wireless communication device 20 can form a communication group with the peripheral wireless communication devices 20 according to the Wi-Fi direct being formed in the Wi-Fi Alliance, and wirelessly communicate with the peripheral wireless communication devices 20 forming the communication group.

When the users belonging to the same community get together in real life, it is convenient as each user can data communicate with other users using the wireless communication device 20 as long as the communication group made of the wireless communication devices 20 of each user can be easily formed.

In this regards, a proposal is made in having each user input the same keyword to the wireless communication device 20 and forming the communication group with the plurality of wireless communication devices 20 input with the same keyword. However, in such method, even a third person can join the communication group if such third person knows the keyword. Therefore, the method has an issue of being unsuitable for forming a closed communication group in which the participants are to be limited such as to the users belonging to the same community.

The embodiment of the present invention has been contrived in view of the above situations. According to the embodiment of the present invention, the communication group including the wireless communication devices 20 of a plurality of users belonging to a community on the network 12 can be easily formed. The wireless communication device 20 according to the embodiment of the present invention will be hereinafter described in detail.

<2. Configuration of Wireless Communication Device>

Figure 2:
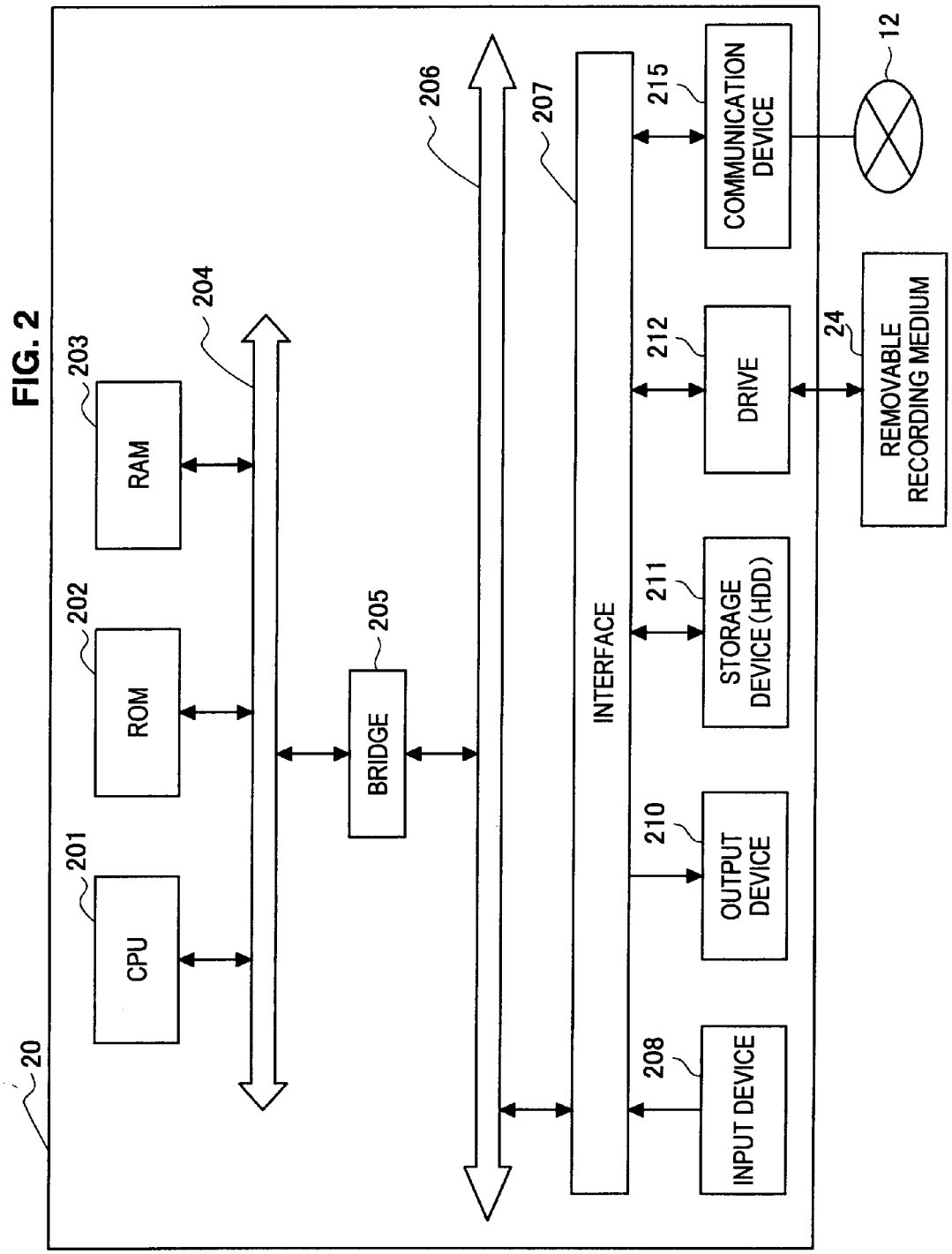
FIG. 2 is a block diagram showing a hardware configuration of a wireless communication device.

FIG. 2 is a block diagram showing a hardware configuration of the wireless communication device 20. The wireless communication device 20 includes a CPU (Central Processing Unit) 201, a ROM (Read Only Memory) 202, a RAM (Random Access Memory) 203, and a host bus 204. The wireless communication device 20 also includes a bridge 205, an external bus 206, an interface 207, an input device 208, an output device 210, a storage device (HDD) 211, a drive 212, and a communication device 215.

The CPU 201 functions as an arithmetic processing device and a control device, and controls the overall operation of the wireless communication device 20 according to various programs. The CPU 201 may also be a microprocessor. The ROM 202 stores programs, operation parameters, and the like used by the CPU 201. The RAM 203 temporarily stores programs used in the execution of the CPU 201, parameters that appropriately change in the execution, and the like. These components are mutually connected by the host bus 204 configured by a CPU bus, and the like.

The host bus 204 is connected to the external bus 206 such as a PCI (Peripheral Component Interconnect/Interface) bus through the bridge 205. The host bus 204, the bridge 205, and the external bus 206 may not be separately configured, and the functions thereof may be mounted on one bus.

The input device 208 is configured by an input means for enabling the user to input information such as a mouse, a keyboard, a touch panel, a button, a microphone, a switch, and a lever, an input control circuit for generating an input signal based on the input of the user and outputting the same to the CPU 201, and the like. The user of the wireless communication device 20 operates the input device 208 to input various types of data or to instruct processing operations to the wireless communication device 20.

The output device 210 includes a display device such as a CRT (Cathode Ray Tube) display device, a liquid crystal display (LCD) device, an OLED (Organic Light Emitting Diode) device, and a lamp. The output device 210 also includes an audio output device such as a speaker and a headphone. The output device 210 outputs the reproduced content, for example. Specifically, the display device displays various types of information such as reproduced video data in text or image. The audio output device, on the other hand, converts the reproduced audio data etc. to audio, and outputs the same.

The storage device 211 is a data storing device configured as an example of a storage unit of the wireless communication device 20 according to the present embodiment. The storage device 211 may include a storage medium, a storage device for recording data on the storage medium, a read device for reading the data from the storage medium, a delete device for deleting the data recorded on the storage medium, and the like. The storage device 211 is configured by an HDD (Hard Disk Drive). The storage device 211 drives the hard disk and stores programs executed by the CPU 201 and various types of data.

The drive 212 is a storage medium reader/writer, and is incorporated in or externally attached to the wireless communication device 20. The drive 212 reads information recorded on an attached removable storage medium 24 such as a magnetic disk, an optical disk, a magnet-optical disk, or a semiconductor memory, and outputs the same to the RAM 203. The drive 212 can also write information to the removable storage medium 24.

The communication device 215 is a communication interface configured by a communication device and the like for connecting to the network 12. The communication device 215 may be a wireless LAN (Local Area Network) compatible communication device, an LTE (Long Term Evolution) compatible communication device, or a wire communication device that carries out wired communication.

The hardware configuration of the wireless communication device 20 has been described above with reference to FIG. 2. The functions of the wireless communication device 20 will now be described.

Figure 3:
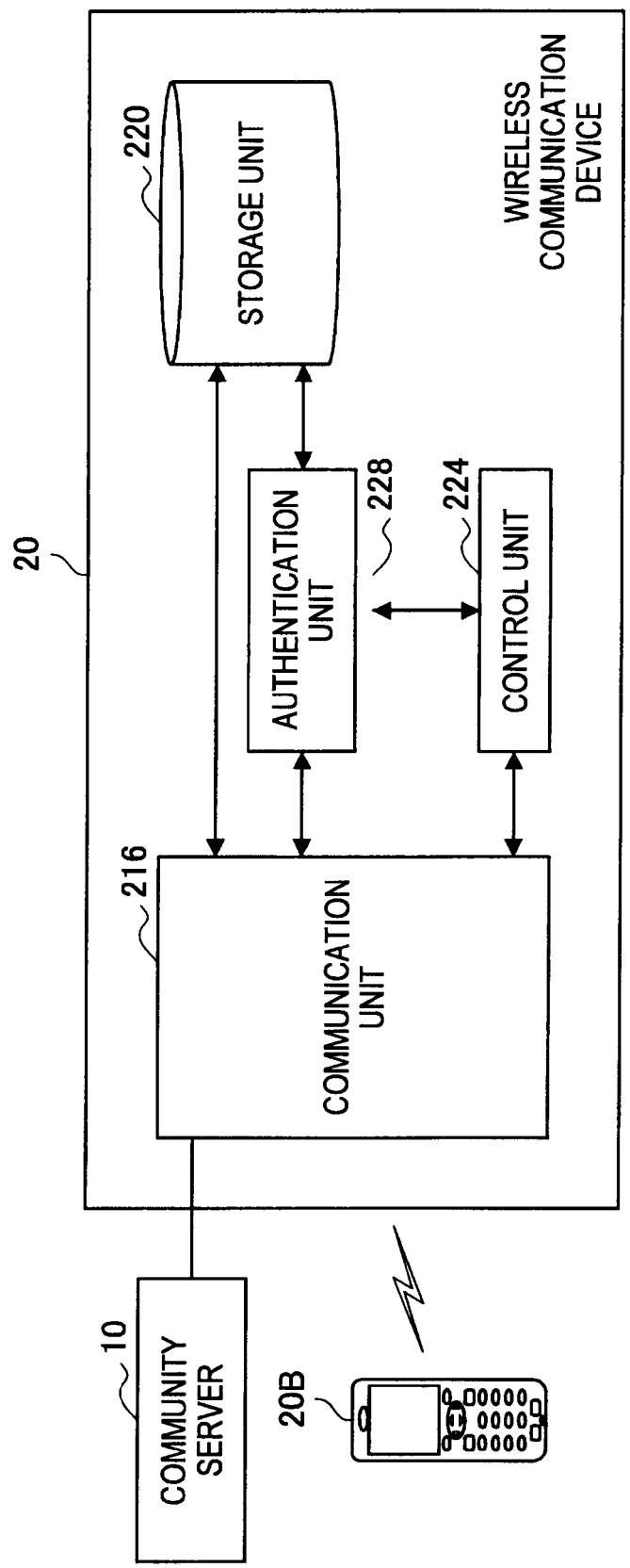
FIG. 3 is a functional block diagram showing the configuration of the wireless communication device.

FIG. 3 is a functional block diagram showing the configuration of the wireless communication device 20. As shown in FIG. 3, the wireless communication device 20 includes a communication unit 216, a storage unit 220, a control unit 224, and an authentication unit 228.

The communication unit 216 is an interface with the community server 10 and another wireless communication device 20B. The communication unit 216 functions as a transmission unit and a reception unit for transmitting and receiving community information such as Community Information Query Request and Community Information Query Response, which are to be described later.

The storage unit 220 is a storage medium for storing a common key distributed as authentication information to a plurality of users including the user of the wireless communication device 20 belonging to a certain community. For instance, if the user of the wireless communication device 20 belongs to the origami club, the common key for the origami club is distributed to the user of the wireless communication device 20, and the storage unit 220 stores such common key for the origami club.

The method of distributing the common key is not particularly limited. For instance, the community server 10 may transmit the common key to the user belonging to each community, or the common key may be arranged on the Web site of the community and each user may acquire the common key from the Web site of the community. The common key may be generated by the community server 10, or may be generated by a user device of the user belonging to the community.

The common key may be distributed to an information processing device different from the wireless communication device 20, in which case the storage unit 220 can store the common key by moving the common key from the information processing device to the wireless communication device 20. Furthermore, the authentication information distributed to each user is not limited to the common key, and the authentication information distributed to each user may be an individual key unique to each user.

The storage unit 220 may be a storage medium such as a nonvolatile memory, a magnetic disk, an optical disk, or an MO (Magneto Optical) disk. The nonvolatile memory includes an EEPROM (Electrically Erasable Programmable Read-Only Memory), and an EPROM (Erasable Programmable ROM). The magnetic disk includes a hard disk and a disk-shaped magnetic body disk. The optical disk includes a CD (Compact Disc), a DVD-R (Digital Versatile Disc Recordable) and a BD (Blu-Ray Disc (registered trademark)).

The control unit 224 controls the overall operation by the wireless communication device 20. For instance, the control unit 224 performs determination of the usage frequency, creation of a control message such as a beacon (when operating as the group owner) or a reception response of the beacon (when operating as the client), interpretation of the transmission command and the control message, and the like. The control unit 224 also performs negotiation of roles with another wireless communication device 20B to determine whether to operate as the group owner or the client, encryption setting for forming the communication group, and the like.

The control unit 224 determines whether or not the community to which the user of the wireless communication device 20 belongs and the community to which the user of another wireless communication device 20B belongs are the same, and one is the organizer of the relevant community and the other is the member of the relevant community.

When above conditions are satisfied, the authentication process by the authentication unit 228 is performed. If the above condition is not satisfied since both users are the members of the same community, and the wireless communication device 20 has the organizer information (e.g., MAC address of the organizer device) of the relevant community, the control unit 224 transmits the organizer information from the communication unit 216.

The authentication unit 228 uses the common key of the community stored in the storage unit 220 to perform the mutual authentication with another wireless communication device 20B, and the like. The wireless communication device 20 according to the embodiment of the present invention forms the communication group with another wireless communication device 20 if mutually authenticated with another wireless communication device 20 by the authentication unit 228, and does not form the communication group with another wireless communication device 20 if not mutually authenticated.

Thus, the wireless communication device 20 having the same common key, that is, the wireless communication device 20 of the users belonging to the same group can easily form the closed communication group. A specific operation example of the wireless communication device 20 and the wireless communication system 1 will be hereinafter described in detail.

<3. Operation of Wireless Communication System>

Figure 4:
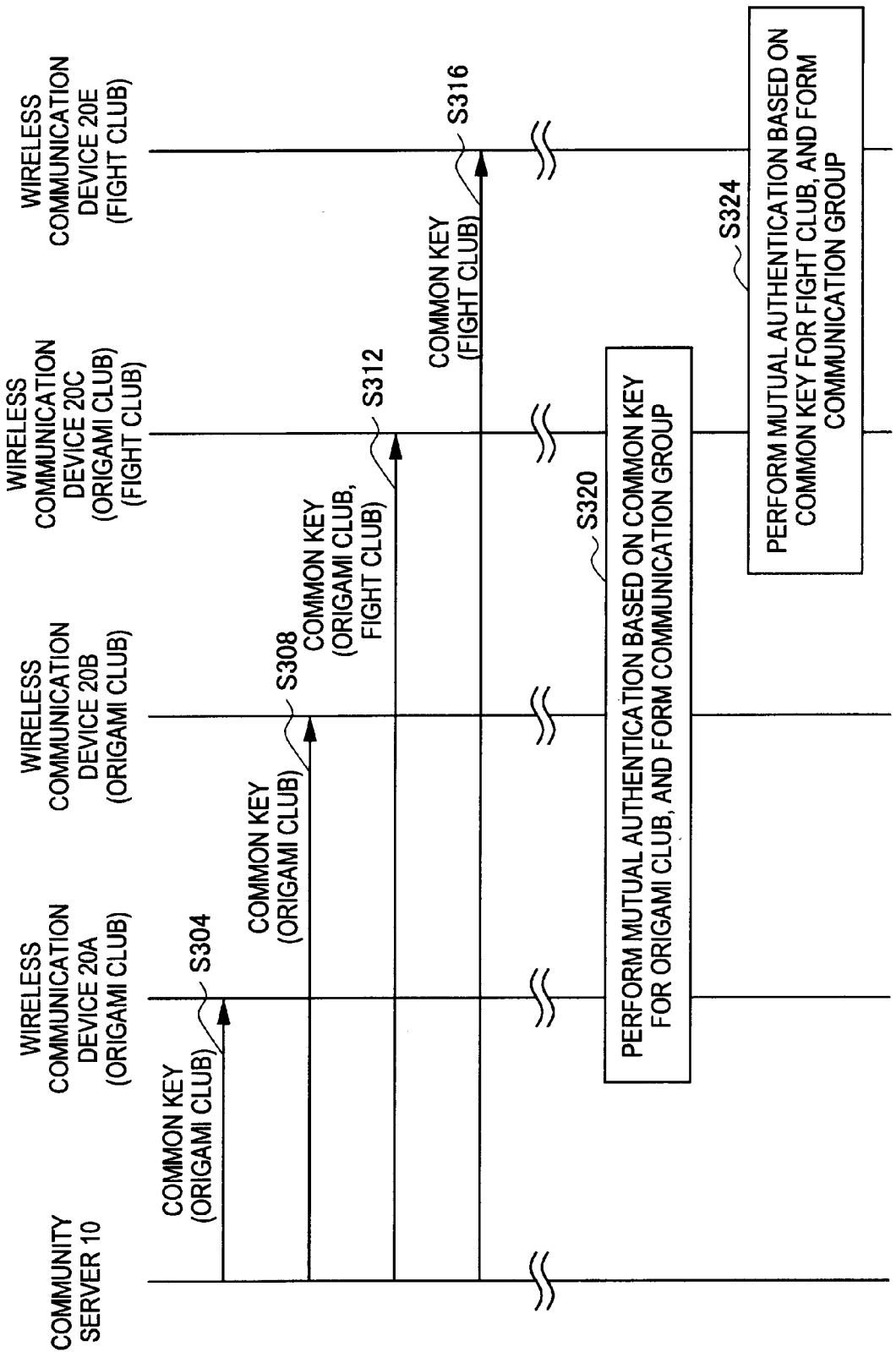
FIG. 4 is a sequence chart showing an operation outline of the wireless communication system according to the embodiment of the present invention.

FIG. 4 is a sequence chart showing an operation outline of the wireless communication device 1 according to the embodiment of the present invention. As shown in FIG. 4, the community server 10 distributes the common key for the community, to which the user of each wireless communication device 20 belongs, to each wireless communication device 20.

Specifically, the community server 10 transmits the common key for the origami club to the wireless communication devices 20A and 20B of the users belonging to the origami club (S304, S308). The community server 10 transmits the common key for the origami club and the common key for the fight club to the wireless communication device 20C of the user belonging to the origami club and the fight club (S312). Similarly, the community server 10 transmits the common key for the fight club to the wireless communication device 20E of the user belonging to the fight club (S316).

Thereafter, when the wireless communication devices 20A to 20C of the users belonging to the origami club approach in actual world, the wireless communication devices 20A to 20C can perform mutual authentication (or one-way authentication) based on the common key for the origami club, and form the communication group (S320). Similarly, when the wireless communication devices 20D and 20E of the users belonging to the fight club approach in actual world, the wireless communication devices 20D and 20E can perform mutual authentication (or one-way authentication) based on the common key for the fight club, and form the communication group (S324).

<4. Operation of Wireless Communication Device>

The operation outline of the wireless communication system 1 has been described above with reference to FIG. 4. The detailed operation by each wireless communication device 20 for forming the communication group will now be described with reference to FIGS. 4 to 12.

FIRST OPERATION EXAMPLE

Figure 5:
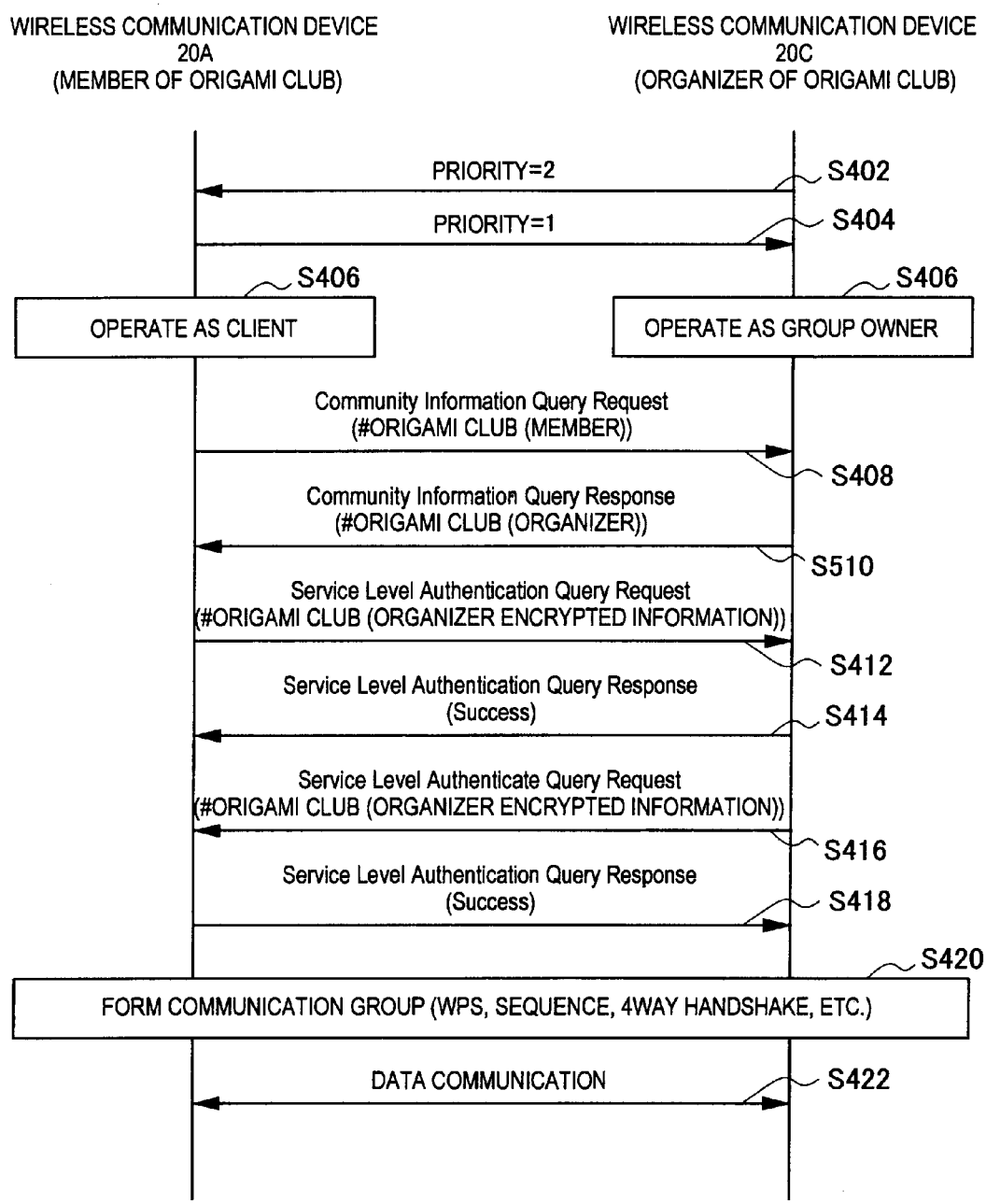
FIG. 5 is a sequence chart showing a first operation example by the wireless communication device.

FIG. 5 is a sequence chart showing the first operation example by the wireless communication device 20. In the first operation example, assume that the user of the wireless communication device 20A is the member of the origami club, the user of the wireless communication device 20C is the organizer of the origami club, and the wireless communication devices 20A and 20C share the common key for the origami club.

As shown in FIG. 5, the wireless communication devices 20A and 20C first perform negotiation of roles to be played in the communication group. The negotiation of roles is carried out by exchanging information indicating the priority with which each wireless communication device 20 operates as a group owner. In the first operation example, the user of the wireless communication device 20C is desirably the organizer of the origami club and the wireless communication device 20C operates as the group owner, and hence the wireless communication device 20C transmits the information indicating high priority ("2" in the example shown in FIG. 5) (S402). On the other hand, the wireless communication device 20A transmits the information indicating low priority ("1" in the example shown in FIG. 5) since the user of the wireless communication device 20A is the member of the origami club (S404).

As it can be recognized that the wireless communication device 20C of the wireless communication devices 20A and 20C has a higher priority, the wireless communication device 20A is determined to operate as the client, and the wireless communication device 20C is determined to operate as the group owner (S406).

Thereafter, the wireless communication device 20A transmits a Community Information Query Request indicating the origami club, the community to which the user of the wireless communication device 20A belongs and the role information (member) (S408). The wireless communication device 20C then transmits a Community Information Query Response indicating the origami club, the community to which the user of the wireless communication device 20C belongs and the role information (organizer) (S410).

The configuration example of the Community Information Query Request and the Community Information Query Response will now be described with reference to FIGS. 6 and 7.

FIG. 6 is an explanatory view showing a configuration example of a Community Information Query Request. As shown in FIG. 6, an Initial Request Action Frame defined in IEEE 802.11u can be used for the Community Information Query Request.

More specifically, the Community Information Query Request has the community information and the role information described in the Request Value of the Query Data in the Vendor Specific Content of the Query Request.

FIG. 7 is an explanatory view showing a configuration example of a Community Information Query Response. As shown in FIG. 7, an Initial Response Action Frame defined in IEEE 802.11u can be used for the Community Information Query Response.

More specifically, the Community Information Query Response has the community information and the role information described in the Response Value of the Response Data in the Vendor Specific Content of the Query Response.

The wireless communication devices 20A and 20C are able to recognize the community, to which the other user belongs, and the role information by the transmission and reception of the Community Information Query Request and Response.

Each wireless communication device 20 performs the following authentication process when a community common with the other wireless communication device 20 exists and one of the users of the own device or the other wireless communication device 20 is the organizer and the other is the member. Each wireless communication device 20 does not perform the following authentication process if any one of the above conditions is not satisfied. In the first operation example shown in FIG. 5, the wireless communication devices 20A and 20C perform the following authentication process since the community of the wireless communication devices 20A and 20C is common, the user of the wireless communication device 20A is the member, and the user of the wireless communication device 20C is the organizer.

Specifically, the authentication unit 228 of the wireless communication device 20C generates encrypted information based on the common key for the origami club stored in the storage unit 220, and the communication unit 216 transmits a Service Level Authentication Query Request as an authentication request including the encrypted information (S412). For instance, the authentication unit 228 may encrypt a character string including the MAC address of the wireless communication device 20C and the current time by AES-256 using the common key for the origami club. According to such configuration, the MAC address or the time information will differ even if the wireless communication device of the user not belonging to the same community attempts to perform authentication by snooping, and hence the authentication of the wireless communication device of the user not belonging to the same community can be prevented from being successful.

When the wireless communication device 20A receives the Service Level Authentication Query Request from the wireless communication device 20C, the authentication unit 228 performs authentication of the encrypted information using the common key for the origami club stored in the storage unit 220. For instance, the authentication unit 228 of the wireless communication device 20A decrypts the encrypted information using the common key for the origami club, where the authentication is considered successful when the MAC address of the wireless communication device 20C, which is the communication counterpart, and the time same as the current time (e.g. time within one minute from the current time) are obtained. The wireless communication device 20A then transmits a Service Level Authentication Query Response indicating the authentication result as an authentication response (S414).

The configuration example of the Service Level Authentication Query Request and the Service Level Authentication Query Response will now be described with reference to FIGS. 8 and 9.

FIG. 8 is an explanatory view showing a configuration example of the Service Level Authentication Query Request. As shown in FIG. 8, an Initial Request Action Frame defined in IEEE 802.11u can be used for the Service Level Authentication Query Request.

Specifically, the Service Level Authentication Query Request has the encrypted information described in the Query Value of the Query Data in the Vendor Specific Content of the Query Request.

FIG. 9 is an explanatory view showing a configuration example of the Service Level Authentication Query Response. As shown in FIG. 9, an Initial Response Action Frame defined in IEEE 802.11u can be used for the Service Level Authentication Query Response.

Specifically, the Service Level Authentication Query Response has the authentication result (success or fail) described in the Response Value of the Response Data in the Vendor Specific Content of the Query Response.

After S414, the authentication unit 228 of the wireless communication device 20A generates the encrypted information, and the communication unit 216 transmits the Service Level Authentication Query Request including the encrypted information (S416). After the authentication unit 228 of the wireless communication device 20C performs the authentication of the encrypted information, the communication unit 216 of the wireless communication device 20C transmits the Service Level Authentication Query Response indicating the authentication result (S418).

When the mutual authentication of the wireless communication devices 20A and 20C becomes successful through transmission and reception of the Service Level Authentication Query Request and Response, the wireless communication devices 20A and 20C perform a process for forming a communication group (S420). For instance, the wireless communication devices 20A and 20C perform encryption setting of a communication path such as WPS sequence and 4 way handshake, and starts data communication (S422).

As described above, according to the embodiment of the present invention, the wireless communication devices 20 of the users belonging to the same community on the network can easily form a closed communication group. Furthermore, the wireless communication device 20 of the user, who is the organizer, can preferentially operate as the group owner. An example in which the wireless communication device 20A and the wireless communication device 20C perform mutual authentication has been described above, but the form of authentication process is not limited to such example, and one of the wireless communication device 20A and the wireless communication device 20C may merely perform the one-way authentication. By way of one example, the form of the authentication process may be that in which the wireless communication device 20C, which is the organizer side, merely authenticates the wireless communication device 20A, which is the member side (i.e., processes shown in S412 and S414 in FIG. 5 may be omitted). This is the same for a second operation example and a third operation example to be hereinafter described.

SECOND OPERATION EXAMPLE

A second operation example of the wireless communication device 20 will now be described with reference to FIG. 10.

Figure 10:
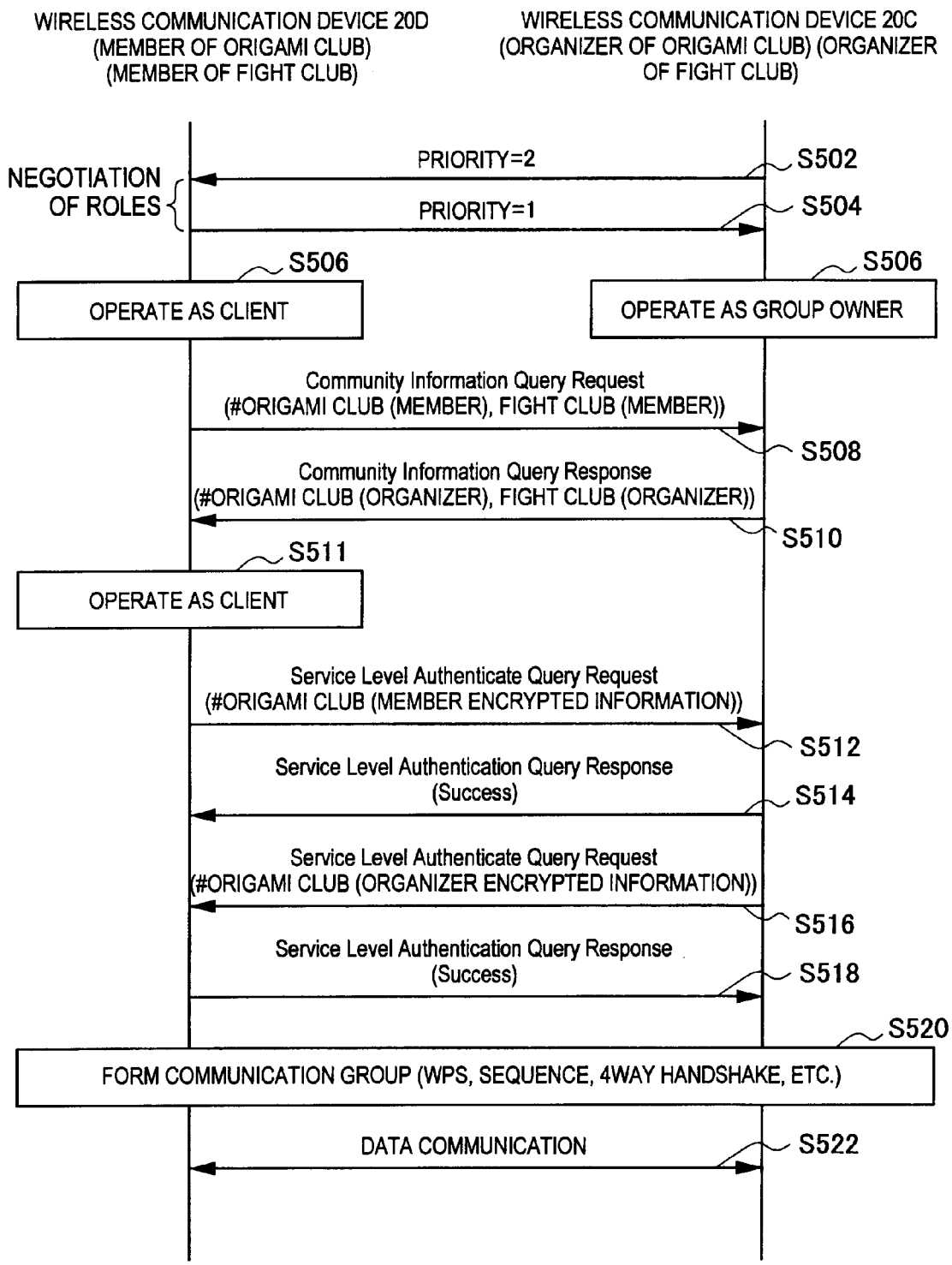
FIG. 10 is a sequence chart showing a second operation example by the wireless communication device.

FIG. 10 is a sequence chart showing a second operation example by the wireless communication device 20. In the second operation example, assume that the user of the wireless communication device 20D is the member of the origami club and the member of the fight club, the user of the wireless communication device 20C is the organizer of the origami club and the fight club, and the wireless communication devices 20C and 20D share the common key for the origami club and the common key for the fight club.

As shown in FIG. 10, the wireless communication devices 20C and 20D first perform negotiation of roles to be played in the communication group. In the second operation example, the user of the wireless communication device 20C is desirably the organizer of the origami club and the fight club, and the wireless communication device 20C operates as the group owner, and hence the wireless communication device 20C transmits the information indicating high priority ("2" in the example shown in FIG. 10) (S502). On the other hand, the wireless communication device 20D transmits the information indicating low priority ("1" in the example shown in FIG. 10) since the user of the wireless communication device 20D is the member of the origami club and the fight club (S504).

As it can be recognized that the wireless communication device 20C of the wireless communication devices 20C and 20D has a higher priority, the wireless communication device 20D is determined to operate as the client, and the wireless communication device 20C is determined to operate as the group owner (S506).

Thereafter, the wireless communication device 20D transmits the Community Information Query Request indicating the community information (member of origami club, member of fight club) of the user of the wireless communication device 20D (S508). The wireless communication device 20C then transmits the Community Information Query Response indicating the community information of the user of the wireless communication device 20C (organizer of origami club, organizer of fight club) (S510).

In the second operation example shown in FIG. 10, both the origami club and the fight club satisfy the condition that the community is common between the wireless communication devices 20, where one is the member of the community and the other is the organizer of the community. Thus, the wireless communication device 20D selects one community (e.g., origami club) based on the user operation through a selection screen (S511).

Thereafter, the authentication unit 228 of the wireless communication device 20D generates the encrypted information based on the common key for the origami club stored in the storage unit 220, and the communication unit 216 transmits the Service Level Authentication Query Request including the encrypted information (S512).

When the wireless communication device 20C receives the Service Level Authentication Query Request from the wireless communication device 20D, the authentication unit 228 performs authentication of the encrypted information using the common key for the origami club stored in the storage unit 220. The wireless communication device 20C then transmits a Service Level Authentication Query Response indicating the authentication result as an authentication response (S514).

Furthermore, the authentication unit 228 of the wireless communication device 20C generates the encrypted information, and the communication unit 216 transmits the Service Level Authentication Query Request including the encrypted information (S516). After the authentication unit 228 of the wireless communication device 20D performs the authentication of the encrypted information, the communication unit 216 of the wireless communication device 20D transmits the Service Level Authentication Query Response indicating the authentication result (S518).

When the mutual authentication of the wireless communication devices 20C and 20D becomes successful through transmission and reception of the Service Level Authentication Query Request and Response, the wireless communication devices 20C and 20D perform a process for forming a communication group (S520). For instance, the wireless communication devices 20C and 20D perform encryption setting of a communication path such as WPS sequence and 4 way handshake, and starts data communication (S522).

As described above, when two wireless communication devices 20 belong to a plurality of communities and have the common key for each community, one community is selected to form the communication group.

THIRD OPERATION EXAMPLE

A third operation example of the wireless communication device 20 will now be described with reference to FIG. 11.

Figure 11:
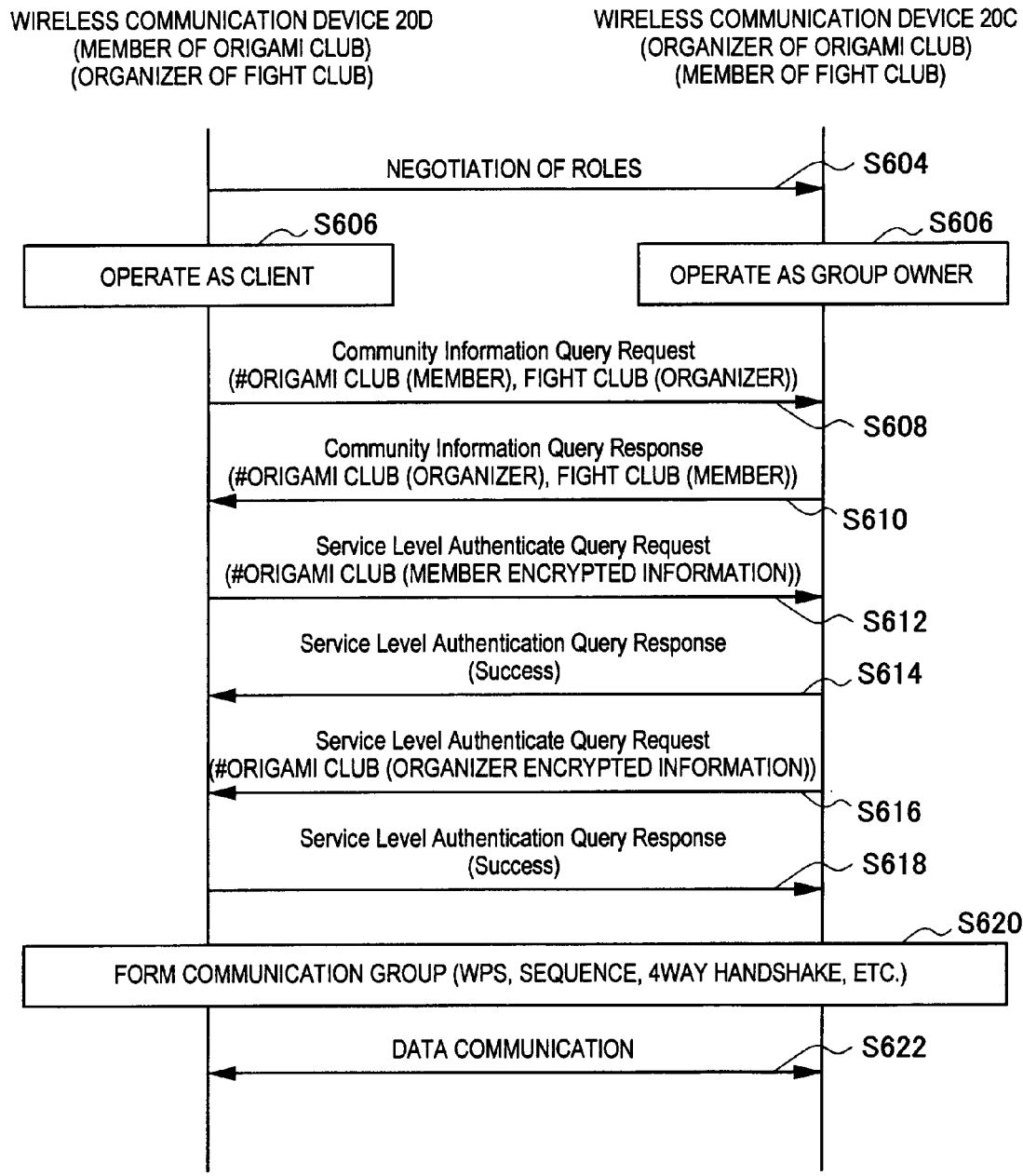
FIG. 11 is a sequence chart showing a third operation example by the wireless communication device.

FIG. 11 is a sequence chart showing the third operation example by the wireless communication device 20. In the third operation example, assume that the user of the wireless communication device 20D is the member of the origami club and the organizer of the fight club, and the user of the wireless communication device 20C is the organizer of the origami club and the member of the fight club.

When the wireless communication devices 20C and 20D are organizers of different communities as in the third operation example, the wireless communication devices 20C and 20D may randomly select the priority of operating as the group owner, or the magnitude relationship may be set in advance. As a result, for example, the wireless communication device 20D is determined to operate as the client, and the wireless communication device 20C is determined to operate as the group owner (S602, S606).

Thereafter, the wireless communication device 20D transmits the Community Information Query Request indicating the community information (organizers of origami club, fight club) of the user of the wireless communication device 20D (S608). The wireless communication device 20C then transmits the Community Information Query Response indicating the community information (organizer of origami club, member of fight club) of the user of the wireless communication device 20C (S610).

The wireless communication device 20D determined to operate as the client may transmit only the community information of the origami club where the user of the wireless communication device 20D is the member. Similarly, the wireless communication device 20C determined to operate as the group owner may transmit only the community information of the origami club where the user of the wireless communication device 20C is the organizer.

Thereafter, the authentication unit 228 of the wireless communication device 20D generates the encrypted information based on the common key for the origami club stored in the storage unit 220, and the communication unit 216 transmits the Service Level Authentication Query Request including the encrypted information (S612).

When the wireless communication device 20C receives the Service Level Authentication Query Request from the wireless communication device 20D, the authentication unit 228 performs authentication of the encrypted information using the common key for the origami club stored in the storage unit 220. The wireless communication device 20C then transmits the Service Level Authentication Query Response indicating the authentication result as an authentication response (S614).

Furthermore, the authentication unit 228 of the wireless communication device 20C generates the encrypted information, and the communication unit 216 transmits the Service Level Authentication Query Request including the encrypted information (S616). After the authentication unit 228 of the wireless communication device 20D performs the authentication of the encrypted information, the communication unit 216 of the wireless communication device 20D transmits the Service Level Authentication Query Response indicating the authentication result (S618).

When the mutual authentication of the wireless communication devices 20C and 20D becomes successful through transmission and reception of the Service Level Authentication Query Request and Response, the wireless communication devices 20C and 20D perform a process for forming a communication group (S620). For instance, the wireless communication devices 20C and 20D perform encryption setting of a communication path such as WPS sequence and 4 way handshake, and starts data communication (S622).

FOURTH OPERATION EXAMPLE

A fourth operation example of the wireless communication device 20 will now be described with reference to FIG. 12.

Figure 12:
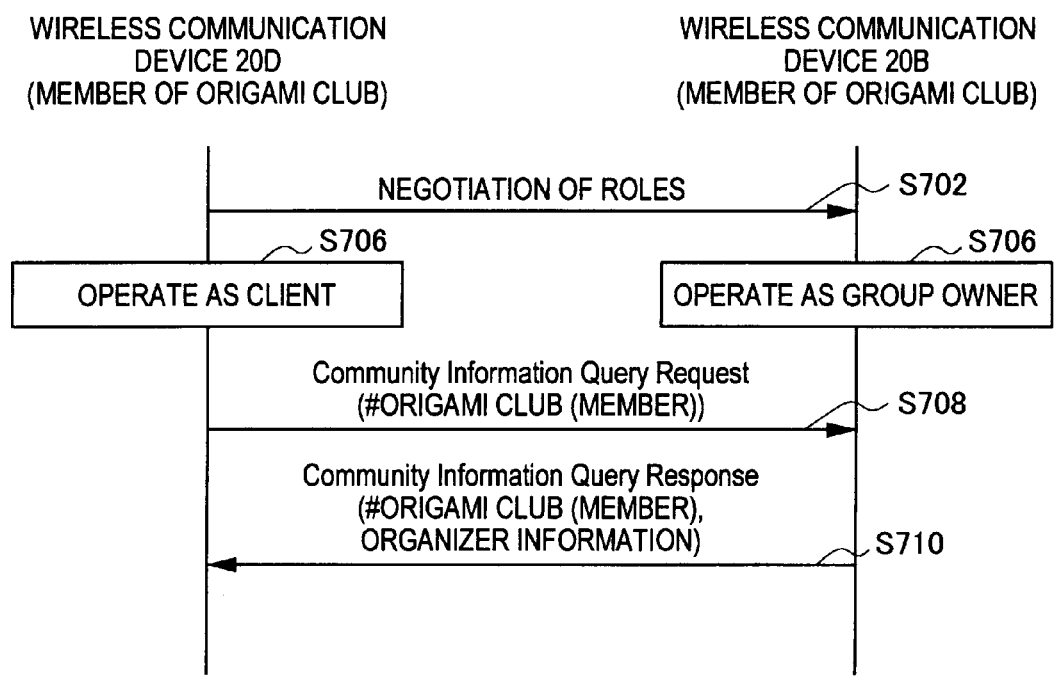
FIG. 12 is a sequence chart showing a fourth operation example by the wireless communication device.

FIG. 12 is a sequence chart showing the fourth operation example by the wireless communication device 20. In the fourth operation example, assume that the user of the wireless communication device 20A is the member of the origami club, and the user of the wireless communication device 20B is the member of the origami club.

As shown in FIG. 12, the wireless communication device 20A and the wireless communication device 20B perform the negotiation of roles (S702), where the wireless communication device 20A is determined to operate as the client, and the wireless communication device 20B is determined to operate as the group owner (S706).

Thereafter, the wireless communication device 20A transmits the Community Information Query Request indicating the community information (member of origami club) of the user of the wireless communication device 20A (S708).

Thus, the wireless communication device 20B can understand that the user of the wireless communication device 20A is the member of the common origami club, but both the user of the wireless communication device 20A and the user of the wireless communication device 20B are members in the community. When including the organizer information (e.g., MAC address of the wireless communication device 20 of the organizer) of the origami club instead of forming the communication group with the wireless communication device 20A, the wireless communication device 20B transmits the Community Information Query Response including the organizer information (S710). The wireless communication device 20B can then urge the formation of the communication group with the organizer of the origami club to the wireless communication device 20A.

<5. Conclusion>

As described above, according to the embodiment of the present invention, the wireless communication devices 20 of the users belonging to the same community on the network can easily form a closed communication group using the common key distributed in advance. Furthermore, the wireless communication device 20 of the user, who is the organizer in the community, can preferentially operate as the group owner.

It should be understood by those skilled in the art that various modifications, combinations, sub-combinations and alterations may occur depending on design requirements and other factors insofar as they are within the scope of the appended claims or the equivalents thereof.

For instance, each step in the processes of the wireless communication system 1 or the wireless communication device 20 of the present specification may not be processed in time-series according to the order described as a sequence chart. In other words, each step in the processes of the wireless communication system 1 or the wireless communication device 20 may be processed in the order different from the order described as the sequence chart or may be processed in parallel.

An example in which the negotiation of roles is performed before the transmission and reception of the community information and the encrypted information has been described in the above-described embodiment by way of example, but the negotiation of roles may be performed after the transmission and reception of the community information or the encrypted information. Alternatively, the exchange of the community information may be used for the negotiation of roles. Specifically, when one is the member and the other is the organizer, the one serving as the member may be determined to operate as the client, and the other one serving as the organizer may be determined to operate as the group owner.

Furthermore, a computer program for causing the hardware such as the CPU 201, the ROM 202, and the RAM 203 incorporated in the wireless communication device 20 to exhibit the functions same as each configuration of the above-described wireless communication device 20 can be created. A storage medium having the relevant computer program stored therein is also provided.

The present application contains subject matter related to that disclosed in Japanese Priority Patent Application JP 2010-022972 filed in the Japan Patent Office on Feb. 4, 2010, the entire content of which is hereby incorporated by reference.

What is claimed is:

1. A wireless communication device comprising:
a storage unit for storing authentication information distributed to a plurality of users including a user of the wireless communication device belonging to a community on a network;
an authentication unit for authenticating a peripheral wireless communication device based on the authentication information stored in the storage unit; and
a control unit for forming a communication group with the peripheral wireless communication device when the authentication of the peripheral wireless communication device by the authentication unit is successful,
wherein when the user of the wireless communication device is an organizer of the community, the wireless communication device performs a negotiation with the peripheral wireless communication device so that the wireless communication device preferentially operates as a group owner of the communication group.

2. The wireless communication device according to claim 1, further comprising:
a transmission unit for transmitting community information corresponding to the community to which the user of the wireless communication device belongs; and a reception unit for receiving the community information of the user of the peripheral wireless communication device from the peripheral wireless communication device, wherein the authentication unit performs the authentication when the community to which the user of the wireless communication device belongs and the community to which the user of the peripheral wireless communication device belongs are the same.

3. The wireless communication device according to claim 2, wherein the transmission unit further transmits information indicating whether or not the user of the wireless communication device is the organizer of the community, and the control unit further forms the communication group with the peripheral wireless communication device when either one of the user of the wireless communication device or the user of the peripheral wireless communication device is the organizer of the community.

4. The wireless communication device according to claim 3, wherein the control unit transmits organizer information of the community from the transmission unit to the peripheral wireless communication device when both of the user of the wireless communication device and the user of the peripheral wireless communication device are not the organizer of the community.

5. A wireless communication method executed by a wireless communication device, the method comprising the steps of:

storing, in a storage medium, authentication information distributed to a plurality of users including a user of the wireless communication device belonging to a community on a network;

authenticating a peripheral wireless communication device based on the authentication information; and forming a communication group with the peripheral wireless communication device when the authentication of the peripheral wireless communication device is successful, wherein when the user of the wireless communication device is an organizer of the community, the wireless communication device performs a negotiation with the peripheral wireless communication device so that the wireless communication device preferentially operates as a group owner of the communication group.

6. A non-transitory computer storage medium storing instructions which, when executed by a wireless communication device, causes the wireless communication device to:

store authentication information distributed to a plurality of users including a user of the wireless communication device belonging to a community on a network;

authenticate a peripheral wireless communication device based on the authentication information stored in the storage unit;

form a communication group with the peripheral wireless communication device when the authentication of the peripheral wireless communication device by the authentication unit is successful, wherein when the user of the wireless communication device is an organizer of the community, the wireless communication device performs a negotiation with the peripheral wireless communication device so that the wireless communication device preferentially operates as a group owner of the communication group.

* * * * *